US008260658B2

(12) United States Patent
Fenstermaker et al.

(10) Patent No.: US 8,260,658 B2
(45) Date of Patent: *Sep. 4, 2012

(54) METHOD FOR VISUAL PRESENTATION OF KEY PERFORMANCE INDICATORS OF A BUSINESS UTILIZING A SQUARIFIED TREE MAP

(76) Inventors: William H. Fenstermaker, Lafayette, LA (US); Alan C. Day, Lafayette, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/190,407

(22) Filed: Jul. 25, 2011

(65) Prior Publication Data

US 2011/0282716 A1    Nov. 17, 2011

Related U.S. Application Data

(63) Continuation of application No. 11/471,436, filed on Jun. 20, 2006, now Pat. No. 8,015,056.

(51) Int. Cl.
*G06Q 10/00* (2012.01)
(52) U.S. Cl. .................................... 705/7.39
(58) Field of Classification Search ............ 705/7.39, 705/7.11
See application file for complete search history.

(56) References Cited

U.S. PATENT DOCUMENTS

| | | | | |
|---|---|---|---|---|
| 6,583,794 B1* | 6/2003 | Wattenberg | | 715/708 |
| 6,919,910 B2* | 7/2005 | Chang | | 345/635 |
| 6,928,436 B2* | 8/2005 | Baudel | | 1/1 |
| 6,963,339 B2* | 11/2005 | Leah et al. | | 345/440 |
| 7,027,052 B1* | 4/2006 | Thorn et al. | | 345/440 |
| 7,051,284 B2* | 5/2006 | Uemura et al. | | 715/752 |
| 7,076,742 B1* | 7/2006 | Thorn et al. | | 715/853 |
| 7,340,678 B2* | 3/2008 | Chiu et al. | | 715/734 |
| 7,346,858 B1* | 3/2008 | Berg et al. | | 715/853 |
| 7,418,424 B2* | 8/2008 | Martin et al. | | 705/37 |
| 7,427,987 B2* | 9/2008 | Uthe | | 345/440 |
| 7,467,045 B2* | 12/2008 | Tabanou et al. | | 702/13 |
| 7,509,591 B1* | 3/2009 | Thorn et al. | | 715/853 |
| 7,593,012 B2* | 9/2009 | Ikehata et al. | | 345/440 |
| 7,605,813 B2* | 10/2009 | Uthe | | 345/440 |
| 7,667,701 B2* | 2/2010 | Leah et al. | | 345/440 |
| 7,870,509 B2* | 1/2011 | Cao et al. | | 715/853 |
| 7,885,841 B2* | 2/2011 | King | | 1/1 |
| 8,015,056 B1* | 9/2011 | Fenstermaker et al. | | 705/7.39 |
| 2003/0158801 A1* | 8/2003 | Chuah | | 705/36 |
| 2003/0158846 A1* | 8/2003 | Ikehata et al. | | 707/7 |
| 2003/0167278 A1* | 9/2003 | Baudel | | 707/102 |

(Continued)

OTHER PUBLICATIONS

Engdahl, Bjorn, Ordered and Unordered Treemap Algorithms and Their Applications on Handheld Devices KTM Numerical Analysis and Computer Science, 2005.*

(Continued)

*Primary Examiner* — Scott L Jarrett
(74) *Attorney, Agent, or Firm* — Lemoine & Associates LLC

(57) ABSTRACT

Data representing key performance indicators of a business enterprise are displayed by computer as a squarified tree map having major nodes each of which represents a profit center of the enterprise and minor nodes each of which represents a project associated with a particular profit center. Size, color and position of each of the minor nodes within a major node and size and position of each the major nodes within the squarified tree map is specified so as to produce a visual display which is highly appealing to the visually perceptive/intuitive processes of the human mind therefore enables rapid managerial response to visually perceived, intuitively sensed deviations from selected performance criteria.

16 Claims, 6 Drawing Sheets
(6 of 6 Drawing Sheet(s) Filed in Color)

U.S. PATENT DOCUMENTS

| | | | |
|---|---|---|---|
| 2004/0168115 A1* | 8/2004 | Bauernschmidt et al. | 715/500 |
| 2004/0169654 A1* | 9/2004 | Walker et al. | 345/440 |
| 2004/0263513 A1* | 12/2004 | Smith et al. | 345/440 |
| 2005/0062741 A1* | 3/2005 | Leah et al. | 345/440 |
| 2006/0082592 A1* | 4/2006 | Black-Ziegelbein et al. | 345/605 |
| 2007/0073757 A1* | 3/2007 | Karlsson et al. | 707/102 |
| 2007/0156495 A1* | 7/2007 | King | 705/8 |

OTHER PUBLICATIONS

Cable, John H. et al., Project Portfolio Earned Value Management Using Treemaps Proceedings of Project Management Institute Research Conference, Jul. 2004.*

Schreck, Tobias et al., Regular TreeMap Layouts for Visual Analysis of Hierarchical Data ACM Spring Conference on Computer Graphics, SCCG/2006, Apr. 20-22, 2006.*

Brown, Jerome et al., TreeMap '97 Retreived from http://otal.umd.edu/Olive/Class/Trees Jun. 17, 2003.*

Shneiderman, Ben et al., Treemaps for space-constrained visualizations of hierarchies Retrieved from http://www.cs.umd.edu/treemap-history/ Jan. 16, 2010.*

Shneiderman, Ben et al., Ordered Treemap Layouts IEEE Symposium on Information Visualization, Oct. 22-23, 2001.*

Songer, A.D. et al., Multidimensional visualization of project control data Construction Innovation, vol. 4, 2004.*

Bederson, Benjamin et al., Ordered and Quantum Treemaps: Making effective use of 2D space to display hierarchies ACM Transactions of Graphics, vol. 21, No. 4, Oct. 2002.*

Burls, Mark et al., Squarified Treemaps Proceedings of the Joint Eurographics and IEEE TCVG Symposium on Visualization, 1999.*

Shneiderman, Ben, Discovering Business Intelligence Using Treemap Visualizations BeyeNetwork, Apr. 11, 2006.*

Shneiderman, Ben, Treemaps for space-constrained visualizations of hierarchies University of Maryland, Dec. 26, 1998-Jun. 25, 2009.*

Card, Stuart K. et al., Readings in Information Visualizations—Using Vision to Think Academic Press, Feb. 8, 1999, | ISBN-10: 1558605339.*

* cited by examiner

METHOD FOR VISUAL PRESENTATION OF KEY PERFORMANCE INDICATORS OF A BUSINESS UTILIZING A SQUARIFIED TREE MAP

CROSS REFERENCE TO RELATED APPLICATION

This application is a continuing patent application emanating from presently pending allowed, U.S. patent application Ser. No. 11/471,436 20 Jun. 2006.

BACKGROUND OF THE INVENTION

1. Field of Invention

The invention disclosed and claimed relates to a method for optimized visual presentation of key performance indicators of the current status of a business enterprise which provides goods or services for profit, which said enterprise includes one or more profit centers each of which profit centers has a plurality of discrete projects. In such business it is highly advantageous to regularly monitor the current status of said profit centers and projects, in relation to other parts or the whole of the business, to ascertain whether said profit centers and projects are currently on track to make a profit for the business when completed. More particularly, the invention relates to use of computer means to display squarified tree maps visually representing one or more levels of hierarchal project and profit center data in a manner which particularly appeals to the perceptive/intuitive, rather than cognitive/interpretive, process of the human mind, thus enables users, such as managers of the business, to instantaneously assess the relative importance of large amounts of business data and thereby rapidly ascertain if and where managerial attention might be best focused.

2. Description of Related Art

Today, the volume and speed of data available for use by a business manager to make decisions has and continues to increase. Advances in computers, networks, and modern database systems have enabled businesses to rapidly collect larger amounts of data about their operations than ever before. Unfortunately the collection of larger and larger amounts of data, with more and more speed, can result in a paradox, namely the complexity and speed of the data can and does slow the ability of managers to read, comprehend and react to said data. In short, the volume and speed at which data collection is currently collected and made available can, and often does, exceed the human minds ability to comprehend and react appropriately to the data. As volume and speed of data collection grows the situation (essentially, "too much for the human mind to rapidly comprehend and react appropriately") may only grow worse. Accordingly managers need tools to help them assess financially related business data in a meaningful, expedient manner in order to assess the relative importance of how various aspects of the business are performing so they may more rapidly respond appropriately to said business data.

Digital computing means have been used to mitigate some of the problem. Many businesses use database software means to store financial data concerning their operations in an electronic, computer read format. Usually said software will have the capacity to at least somewhat organize the data and present same in the form of a "spreadsheet" (either printed or displayed on one or more computer displays) of alpha-numeric characters. While no doubt some organization of data and presentation of somewhat organized data by spreadsheet of alpha-numeric characters represents an improvement over attempting to comprehend and react to large amounts of unorganized data presented in various forms, such means leaves much to be desired. In business of any complexity, spreadsheets of its data can be lengthy, related data can be separated by many pages, and reading and comprehension of alpha-numeric characters requires utilization of the cognitive/interpretive functions of the human brain, which are much slower than the perceptive/intuitive functions of the human brain. Accordingly comprehension and appropriate reaction to data presented in the form of spreadsheet containing alpha-numeric characters can be undesirably difficult (if not impossible) and slow.

Accordingly, in attempt to improve a users ability to comprehend financial data relevant to operations of a business, database programs were developed which have the capability of displaying data as lines, bars, virtual "three dimensional" blocks and/or as pie charts. While these types of presentations improve the users ability to comprehend a larger amount of data, in a shorter period of time, as compared to pages of alpha-numeric characters, they too leave room for much improvement. A line or a bar contains only one level of hierarchal data. Use of many lines to display a second level of hierarchal data can become confusing. If substantial amount of data is to be displayed by line or bar chart a choice must be made as to either loss of resolution (if the data is displayed on one page there is inadequate separation of discrete data from display of adjacent data) or use multiple pages to display the data (and thereby at least partially lose the comparative relevance of discrete data on one page from other discrete data on other pages).

Pie charts have been tried to improve ability of users to comprehend and react to business data, but represent little, if any improvement over line and bar charts. Pie charts are effectively bar charts, presented around a common point rather than along a common line. Since the length of all the bars in a pie chart is the radius of the pie, that dimension become unavailable for display of comparative relevance of discrete "slices" of the "pie". Effectively relative size of a discrete unit of data becomes a portion of the circumference of a circle rather than an length of height of a line or length of a bar and may actually be less readable and comprehensible than line or bar charts.

By contrast the invention disclosed and claim herein utilizes computer means to visually display such key indications of the financial health of a business having one or more goods or service producing profits centers, each of which profit centers, may have one or more projects in a manner, namely that of squarified tree maps, each of which may have a plurality of major-minor (sometimes called parent-child nodes), which is particularly well received by the near instantaneous, perceptive/intuitive processes of the human mind; thereby supporting rapid managerial decision making. In addition the nodes of the display may be provided with various "mouse over" or "hot linked" functions which change the characteristics of the display and/or reveal various levels of underlying hierarchal underlying data, for further analysis as may be desired to support managerial decision making. While the use of squarified tree maps to present certain types of financial data (such as segments of the stock market) is known, such maps have not been previously used as disclosed and claimed herein.

OBJECTS OF THE INVENTION

The general object of the invention is to provide an improved means for displaying key information relating to the current financial health of business which provides goods or services comprised of one or more profit centers having one or more projects within each of said profit centers. With more particularity, an object of the invention is to provide a means whereby current financial health of the described kind of business may be received and processed, almost instantaneously, by means which is tailored to appeal to the perceptive/intuitive, rather than cognitive/interpretive, functions of the human mind. With greater particularity, an object of the invention is to provide the above described data by means which is particularly appealing to the visually perceptive/intuitive functions of the human mind.

Yet another object of the invention is to provide a computer means for visual presentation (display) of key performance indicators of said kind of business by means of squarified tree map, which map may contain and display multiple layers of hierarchal business data arranged as major-minor nodes of a squarified tree map. Another object of the invention is to optionally associate said squarified tree map with various computer input devices, such as mouse or keyboard, which desirably change the view of the data and/or allow display of underlying data and is overall simple, easy and efficient to use.

SUMMARY OF THE INVENTION

The invention disclosed and claimed herein relates to an process for displaying data representing key performance indicators of a service business having one or more profit centers, each of which profit center has one or more projects, in a manner that particularly appeals to the visually-perceptive/intuitive (rather than cognitive/intellectual) processes of the human brain.

In one embodiment of the invention individual projects of the business are displayed as a single rectangle of a squarified tree map, whereby the business' current potential return (such as billed and un-billed time, materials and/or expenses) on the project is represented by size and position attributes of the rectangle and the business' current costs attributable to the project (such as cost of labor, materials, expenses and overhead) is represented by color and intensity of color attributes of the rectangle. Accordingly current potential profitability of each project may be determined by visually perceptive, thus intuitive, almost instantaneous, processes of the human mind. Inasmuch as the tree map contains a plurality of other projects, each of which is displayed using size, position, color and intensity of color attributes, the relative importance of one project in relation to the other projects, also becomes immediately apparent, thereby allowing the viewer, usually a manager of the business, to immediately focus his/her attention where it is most needed. In this preferred embodiment of the invention, the sum of the size of minor (project) nodes becomes the size of the major (profit center) nodes of the squarified tree map, also allowing the viewer to instantly determine, by visually perceptive/intuitive means, the relative importance of the various profits centers of the business.

In another embodiment of the invention the squarified tree map may represent the status of accounts receivable, by arranging clients having outstanding invoices as parent rectangles ("client rectangles") and outstanding invoices to the client as sub-rectangles ("invoice rectangles") within their respective client rectangles. In this embodiment size of the invoice rectangles represents the size of the invoice in terms of dollars (or other currency) and the color of said rectangle as age of the invoice (for example, whether "current", "overdue" and if overdue, how long overdue). In this fashion the viewer may intuitively perceive the magnitude of money that respective clients owes the business and the currency of each invoice to said client.

In yet another embodiment of the invention it can be used to intuitively assess the financial performance of project or other managers of the business, by utilization of a tree map that contains a selected population of managers, wherein parent rectangles of the tree map represent each manager ("manager rectangles"), sub-rectangles therein represent projects having unbilled time, materials or expenses ("unbilled projects"), wherein the size of the sub-rectangles represents the amount unbilled and the color of said rectangle represents how long it has been since last work has been performed on the project. In this way the user can instantaneously assess which managers may not be timely billing their projects and the magnitude of the problem presented.

Various other key data relevant to current "financial health" of a business having one or more profit centers, each of which has a plurality of projects, may be extracted and presented by computer means as one or more squarified tree maps enabling assessment by visually perceptive, instantaneous, intuitive processes of the viewer, allowing the viewer, typically a business manager, to make immediate decisions as to if, where and in what order managerial input may be best applied.

BRIEF DESCRIPTION OF THE DRAWINGS

The patent or application file contains a least one drawing executed in color. Copies of this patent or patent application publication with color drawing(s) will be provided by the Office upon request and payment of the necessary fee.

PREFERRED EMBODIMENTS OF THE INVENTION

Figure 1:
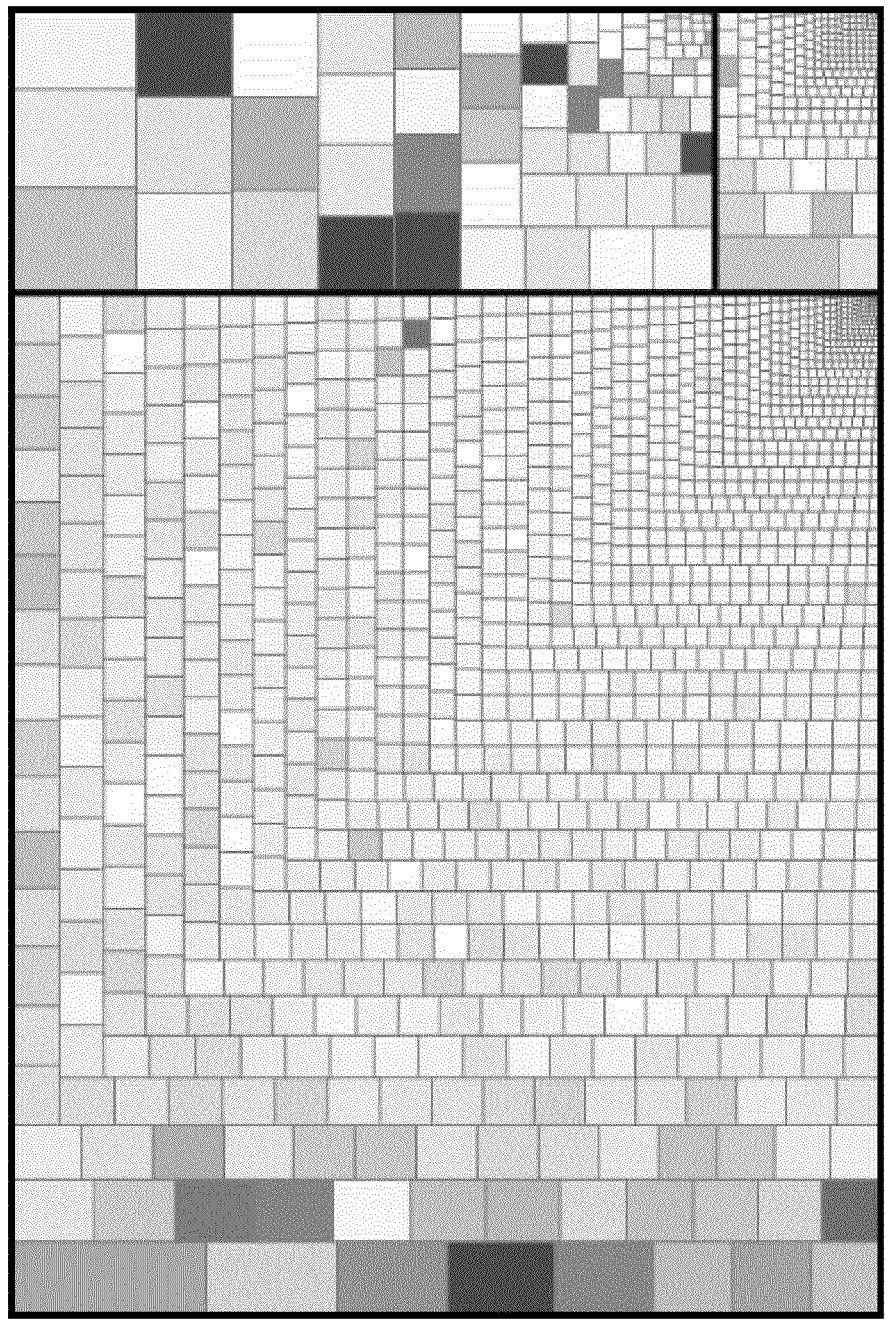
FIG. 1 is an exemplary squarified tree map displaying current potential profitability of a business enterprise wherein the major nodes of said squarified tree map represent respective profit centers of said business enterprise and the minor nodes of said squarified tree map represent respective projects of said respective profit centers of said business enterprise.

While the present invention will be described with reference to preferred embodiments, it will be understood by those who are skilled in the art that various changes may be made and equivalents may be substituted for elements thereof without departing from the scope of the invention. In addition, many modifications may be made to adapt a particular situation or material to the teachings of the invention without departing from the essential scope thereof. It is therefore intended that the present invention not be limited to the particular embodiments disclosed as the best mode contemplated for carrying out this invention, but that the invention will include all embodiments and legal equivalents thereof which are within the scope of the appended claims.

The invention herein disclosed is designed for implementation using digital computing means, associated input, display, print means, operating software and having some form of accounting software (which may be various) which stores financial information of the business in a machine readable format of the corporate accounting database with detailed transactions for discrete operational elements. These elements are organized in a hierarchical fashion creating the multi-dimensional structure of the digital data. For example, in the service business sector the database would likely contain a hierarchical structure of an invoice directly related to a specific client and a client in-turn is related to specific profit center and the work breakdown structure ("WBS") coded line items are related back to the invoice. It is this related numerical complexity that causes the failure of the identification of the key performance factors using traditional visualization techniques.

An object of the invention is to present a small number of key performance indicators by means of visually perceptive/intuitive format, namely that of squarified tree maps, wherein both the magnitude and status of the key performance indicators are indicated by size, position, color and intensity of color of minor (child) nodes of a squarified tree map, each of which said minor (child) nodes is associated with a major (parent) node of said squarified tree map, the size of which is equal to the sum of the sizes of the minor (child) nodes, thereby both magnitude and status of selected aspects of the business can be immediately determined by visually perceptive/intuitive processes of the human mind. Planning of the squarified tree maps to be displayed will preferably involve the following processes.

Determining Key Performance Indicators:

The first step in providing a method for display of current data of a complex business (having one or more profit centers, each of which has one or more projects associated therewith) which provides goods and/or services for profit by means which is particularly adapted to be received by the visually perceptive/intuitive processes of the human mind is to determine the key performance indicators available in the accounting database. These indicators are often broadly defined across diverse business industries and conversely are narrowly defined for specific industry vertical markets. For example profit/loss can be stated as a broad key indicator for all profit oriented business concerns whereas utilization rates might be applied specifically to a services oriented business where percentage of billed labor compared to overall available labor is a key component in the performance of the business and in this example also relates directly to profit/loss.

Extraction of Data:

Once the key performance indicators are determined, the data is programmatically extracted from its digital repository, for example from the corporate accounting relational database. This extraction process will involve collecting all of the relevant indicator data that will be processed for further analysis.

Organization of Data:

Following the extraction of the key performance indicator data, discrete analytical units are determined and separated in order to reduce the single larger set into one or more smaller components for further analysis. At this stage of processing, the data underlying each of the individual analytical units (which will eventually become major nodes of a squarified tree map) are organized as individual, smaller, components (which will become minor nodes of a squarified tree map) of the unit. Each of these smaller units (minor nodes) is assigned a first numerical value representing the magnitude of the performance indicator and the sum of the sizes is assigned to the analytical units (major nodes). In other words, the sum of the smaller component (minor nodes) represents the value of the larger analytical unit and the sum of all of the analytical units (major nodes) represents the total of the entire key performance indicator (the entire tree map). In addition to size, a second numerical value for the status of the smaller units (minor nodes) is assigned to each component of the analytical unit (major nodes). An example of the status smaller units (minor nodes) may be over or under a monetary budget amount for a project.

In addition to size and status, additional attributes for the individual components contained in the analytical units may be extracted to be displayed as an interactive part (for instance by way of "mouse over", left and/or right mouse clicks, and/or key board commands) of the graphical user display. By way of preparation for display, the final step in the organizational stage is to sort all of the data. The analytical units are first sorted according to first numerical value assigned, from largest to smallest and then the individual components contained within each analytical unit are correspondingly sorted (by first numerical value assigned) from largest to smallest.

Presentation of the Data:

A rectangular region of a computer display screen is preferably used to provide the visual user interface. Those skilled in the art will recognize presentation might be accomplished by printer or various other output devices capable of graphical rendition. This rectangular region is used to graphically display each sorted analytical unit (major node) according to the magnitude of the numerical value assigned in the organizational processing stage. Each analytical unit rectangle (major node) is placed within the overall rectangular region by sorted size, which will typically be (but need not necessarily be) in descending order from upper left to lower right of the entire performance indicator (tree map). Within each analytical unit (major node) the smaller rectangular components (minor nodes) will also preferably be sorted size (which will again typically be, but need not necessarily be) from upper left to lower right of the analytical unit (major node) in which they reside. Those skilled in the art will recognize that other forms of sorting may be established. For instance, when the viewer is one accustomed to languages which read from right to left, or vertically, it may be preferable to sort the major and minor nodes in descending order in a direction that user is accustomed to reading.

As each rectangular component is graphically positioned, the X and Y coordinates (thus size of the area) of the rectangle associated with each node is calculated based on the magnitude of the first numerical value assigned during the organizational stage. This produces a graphically representation with a visual component (size) of relative comparisons between each of the analytical unit components (minor node), each analytical unit (major node) in relation to the performance indicator (tree map).

In addition, the status value assigned to each component (minor node) of the analytical unit is visually represented by using a color value assignment on the display screen. This value is calculated automatically from the overall range of deviations in the status numerical values using red, green and blue tuples each having a range of individual numerical values from 0 to 255. The perceptive visual effect of this methodology produces a relative comparison of status deviations that can be instantly recognized. Since people are accustomed to colors of traffic signals, in preferred embodiment of the invention green is used to signify "good" status, and red "bad" status. Increasingly intense shades of red/green are used to signify larger deviation from neutral financial impact on the business. Accordingly, in this embodiment, large, intense green nodes would typically be used to indicate large potential profit (or other desirable performance). By contrast red areas would indicate potential non-profitability (or other undesirable performance). Large, intensely red areas would indicate non-profitability of potentially significant impact on the business, thereby possibly warranting immediate managerial input. By such display the financial size and intensity of problem areas of the business enterprise can be instantaneously assessed by viewers, primarily managers of the business enterprise, for determination of if, when and where managerial actions may be required.

In addition to the size and status performance indicators the attributes assigned to the individual analytical components may be interactively assessable using the computer mouse or keyboard. This enables the viewer immediate access to such further details about problem areas as he/she might chose to review before undertaking managerial action. In a preferred embodiment of the invention as the mouse pointer moves over an analytical component (minor node), the attribute data is displayed in a popup window providing more detailed information about the performance indicator component (minor node). Further user interaction may be provided by incorporating other mouse or keyboard functions to provide display or printing of underlying data corresponding to said indicator component (minor node). By way of example the following preferred embodiments of the invention are discussed further. Presentation of Current Potential Profit, by Profit Centers (Major Nodes) and Projects (Minor Nodes) Performance:

With reference to FIG. 1 is seen an example of a preferred embodiment of the invention, wherein the tree map (of FIG. 1) represents performance status of a selected portion of the business. If desired the entire business may be selected, thus presented.

In this embodiment of the invention, the tree map (FIG. 1) presented will generally include a plurality of major and minor nodes. Each major node, indicated by the bold lines of FIG. 1 of the tree map represents a "profit center" of the business enterprise. It will be recognized that various business enterprises may tailor the definition of what constitutes profits centers according to the particular needs of that type of business and/or the desires of the particular user. However defined, each major node will generally have a plurality of minor nodes indicated by the fine lines of FIG. 1 representing "projects" associated with respective profit centers. It will be recognized that how a particular business defines projects may vary according to the segment of industry in which that business participates or the particular needs of the user. However defined a project should represent a discrete operational function of the business which has potential to generate profit or loss, generally depending on whether it is being well managed. In making such suggestion it is recognized that there are sometimes circumstances extraneous to managerial skill which may affect profit or loss. While the initial level display of the tree map (FIG. 1) does not reveal "why" a profit center or project may currently being conducted in a certain (profitable or non-profitable manner), by viewing said tree map (FIG. 1) the viewer is able to speedily determine, by visually perceptive/intuitive means, whether each profit center and project is currently operating profitably and the magnitude of the potential profit or loss of the analytical unit component (minor node) in comparison to other portions of the business, so that further investigation of particular profit centers and/or projects as desired may take be undertaken. Said initial display may be linked to additional data (through input device, such as computer mouse and keyboard, commands) to facilitate investigation of "why" particular profit centers or projects are performing as they currently are.

Preferably, in this embodiment of the invention, profit centers (major nodes, circumscribed by bold lines of FIG. 1 will generally be defined as discrete types of business that the enterprise engages in, whereas projects (minor nodes, circumscribed by fine lines of FIG. 1) will be generally be defined as discrete operational functions within said types of business which have potential for profit or loss depending, at least in substantial part, on how well such projects are managed. Thus profit centers (circumscribed by bold lines of FIG. 1) become the sum of all projects (circumscribed by fine lines of FIG. 1) within a type (profit center) of business enterprise in which the business engages. In preferred embodiment the overall performance of the business will be the sum of the performance of all the profit centers of the business (as indicated in exemplary form by the entirety of the tree map of FIG. 1).

In this example key indicators of the performance of each project will be determined, extracted and organized as above. Then each project will be displayed a discrete, unitary rectangle (minor node, circumscribed by fine lines of FIG. 1) contained within a profit center (major node, circumscribed by bold lines of FIG. 1) of a whole tree map (FIG. 1).

In this example size of the minor node (project) rectangles should reflect potential financial return of the business if the project is properly managed. For example in profit center which performs services on a time and materials basis, size of the minor (project) node would preferably be total amount of time, multiplied times the billable rate for such time, and billable amount for materials the business has devoted to the project. This represents the amount the customer of the business would have paid to date if all work done on the project were billed and collected as soon as performed by the business.

Next is the color attribute of a minor node. That attribute is determined, in the services on time and expense basis example set forth above, to represent current status of the profitability of the project (represented by the minor node). In said example color would be determined by potential financial return of the project to date (which in this example also represents the size of the minor node) less the business' costs to date (such as the business' cost of labor, material and overhead) attributed to the project. It is thus seen that color attribute chosen to represent satisfactory performance is seen, then the business' potential return on the project to date exceeds the business' cost of performing the project to date, thus business currently has the potential for profiting on the project (when billed and collected). The intensity of the color attribute representing positive deviation from neutral (neither profit or loss) represents increased potential profit at the time.

In a preferred embodiment of the invention the following color attributes are assigned each minor (project) node:

Dark Green: Current billable amount of labor and materials devoted to the project greatly exceeds the total cost of labor, materials and overhead currently attributable to the project.

Middle Shade of Green: Current billable amount of labor and materials devoted to the project substantially exceeds the total cost of labor, materials and overhead currently attributable to the project.

Light Shade of Green: Current billable amount of labor and materials devoted to the project slightly exceeds the total cost of labor, materials and overhead currently attributable to the project.

White or No Color: Current billable amount of labor and materials devoted to the project is approximately equal to total cost of labor, materials and overhead currently attributable to the project.

Light Red: Cost of labor, materials and overhead currently attributable to the project slightly exceeds current billable amount of labor and materials devoted to the project.

Middle Shade of Red: Cost of labor, materials and overhead currently attributable to the project substantially exceeds current billable amount of labor and materials devoted to the project.

Dark Red: Cost of labor, materials and overhead currently attributable to the project greatly exceeds current billable amount of labor and materials devoted to the project.

So encoded large, green (in the example given) minor (project) nodes become indicative of highly positive indicators of positive performance of that project. On the other hand, large areas of dark red (if red is chosen to represent undesirable) minor (project) nodes are indicative of projects that currently show no profit for potential, but to the contrary large potential loss to the business. Viewers of the tree map can thus immediately, by intuitive processes, perceive whether problems exist and the magnitude of same in respect to other aspects of the business. Similarly, since each major node of the map represents a profit center, the areas of which is the sum of the minor (project) nodes of the tree map, problematic profit centers are similarly immediately identifiable.

In the preferred embodiment of the invention increased utility of the tree map is provided by various input device (computer mouse and keyboard) functions.

Figure 2:
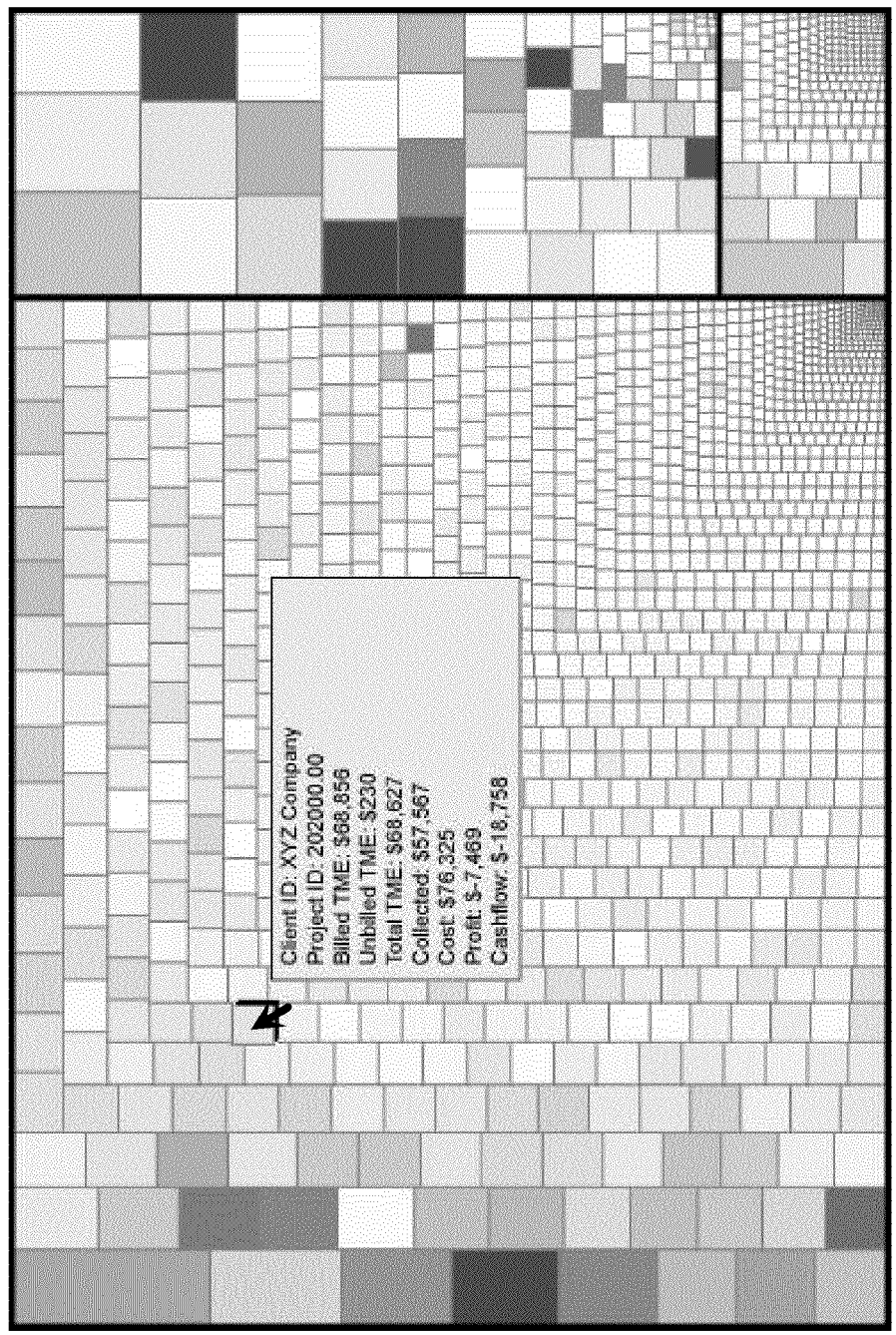
FIG. 2 is the exemplary squarified tree map of FIG. 1 with an exemplary dialog box representing additional data revealed by a computer mouse pointer being over (known as "mouse over" function) a minor (project) node of said FIG. 1.

Mouse-Over Functions: For example, as shown in FIG. 2, a "mouse-over" function may be assigned to each minor node. Namely, when the pointer of a computer mouse goes over a minor (project) node, additional information about that project is displayed in a "pop-up" window or otherwise. For example when the pointer passes over a minor node the following additional information may be displayed in a pop-up window or otherwise:

Client: (client identifying Information)
Project Number: (number assigned to project)
Billed: (amount invoiced as of current date)
Un-billed: (billable amount not billed as of current date)
Paid: (amount paid by client as of current date)
Costs: (cost of labor, materials and overhead attributable as of current date)
Potential Profit: (billed and un-billed amounts less costs as of current date)
Cashflow: (amount paid less amount of costs as of current date)

Left Mouse-Click Functions: In a preferred embodiment of the invention each minor node may be associated with a hyperlink which provides additional detail of the financial data underlying the size, position, color and color intensity attributes assigned each minor (project) node. For instance left mouse click over a minor node may open a squarified tree map showing only the major node (profit center) with which that minor (project) node is associated. Alternatively, left mouse click over a minor node may open a table of all projects listing all clients, project numbers, billed, un-billed, paid, costs, potential profit, and/or cash-flow. On said table project number may have an additional hyperlink that when left-clicked takes the user to the details of labor, material and overhead postings extracted from the accounting system. In two mouse clicks the user can move from broad to narrow accounting transaction details.

Right Mouse-Click Functions: In a preferred embodiment of the invention each minor node may be associated a right click function which opens a pop-up window having functions which either change, print or same the display. Such functions may include "zoom in", "zoom out", "zoom to original size", "copy" or "save" functions.

Keyboard Functions: In a preferred embodiment of the invention the keyboard may be used in conjunction with the mouse to allow the user to zoom in, zoom out and pan the chart to better see smaller nodes. By using keyboard operations found in most drawing software the user can easily navigate around the tree map at various zoom levels. For instance:

Control Key Pressed: May display a magnifying glass which allows the user to zoom in at that location when the left mouse button is pressed.

Control Key+Shift Key Pressed: May display a magnifying glass which allows the user to zoom in at that location when the left mouse button is pressed.

Alt Key Pressed: May be used to display a hand cursor allowing the user to left click and hold the mouse left button down to drag the image in any direction at the current zoom level.

Those skilled in the art will recognize other functions, all of which are intended to be comprehended by the invention herein disclosed and claims, may be associated with Project Center by Project tree map of the current invention.

Figure 3:
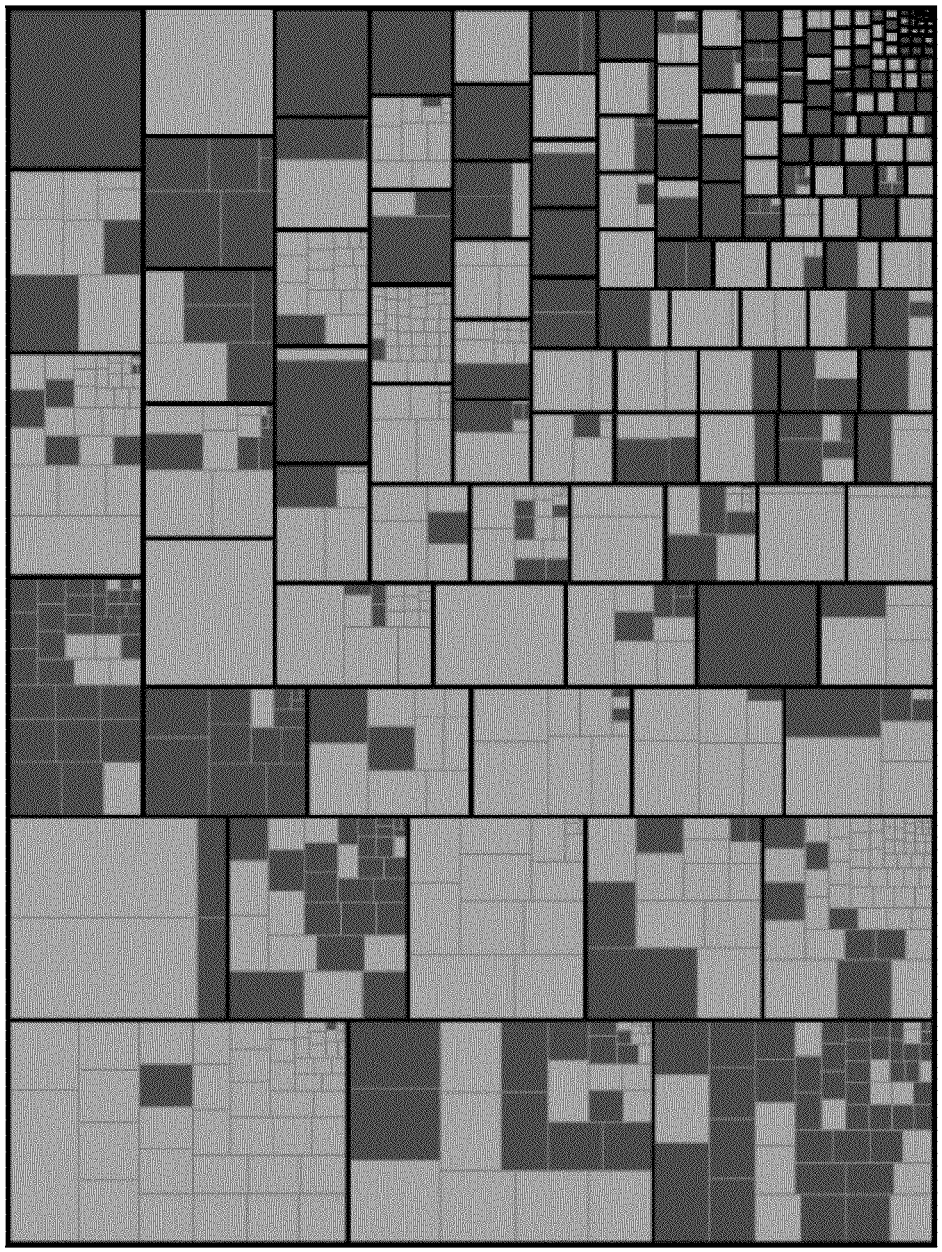
FIG. 3 is an exemplary squarified tree map displaying accounts receivable performance of a business enterprise wherein the major nodes of said squarified tree map represent respective clients of said business enterprise and the minor nodes of said squarified tree map represent respective unpaid invoices of said clients of said business enterprise.

Presentation of Current Accounts Receivable Performance, by Respective Clients (Major Node) and Unpaid Invoices (Minor Node) Performance:

Referring now to FIG. 3 is seen a further way of analyzing the current performance of a business enterprise. This embodiment of the invention may be used to rapidly assess, by visually perceptive, intuitive processes of the viewer, accounts receivable performance of a business. This embodiment may have particular, but not exclusive advantages when a business is engaged in providing "time and materials" services to a customer. In this business segment, time and materials are regularly recorded in a database and invoices for services and materials rendered and/or delivered to clients. These invoices are generated using the corporate accounting system and in doing so create accounts receivable transactions within the accounting database. A key performance indicator for this example is how well the accounting department is doing in collecting the accounts receivable. The need for this key performance indicator is self-evident in that the cash-flow of a service business is directly related to its ability to be paid in a timely manner. As (uncollected) accounts receivables age in time, working capital is reduced producing cash needs which are most frequently fulfilled by lines of credit at financial institutions. Poor performance in accounts receivable activities costs business' money which drives the need to easily measure and monitor it by managers and executives.

With the performance indicator determined, the next step is to extract the data. For this example, extraction of the accounts receivable data can be accomplished using a structured query language statement submitted to the accounting database which will return a data set of records or rows containing each outstanding accounts receivables item. These rows of data have columns containing the amount of the invoice, the age in days of the invoice, the client's name as well as other attributes to be used as part of the interactive graphical display.

Once extracted, the data is now organized into analytical units (major node) which in this example are by respective clients. In FIG. 3 each major node (each of which is associated with an individual client of the business) is circumscribed by the bold lines of FIG. 3. Each client has one or more outstanding invoices and each of which will be represented as rectangle components (minor node) within the analytical unit rectangle. In FIG. 3 each of the minor nodes (associate with an individual invoice) is circumscribed by the fine lines of FIG. 3. By the same extraction, organization and presentation taught above in this embodiment of the invention the amount of each invoice determines the size of the minor node representing that invoice and the age of each invoice is used to determine color and intensity of color of the individual component (minor node) representing that invoice. The sum of the size of the individual analytical components (minor nodes) will be totaled and become the size of the analytical unit (major node), which will represent the total amount of all invoices owed to the business by the client associated with said major node. The status performance indicator will be assigned as the age of the invoice in days. The visual representation of the status performance indicator will as above be represented by color of each minor (invoice) node. By way of example only the following colors may be used to indicate status of each invoice:

Dark Green: Invoice age of 0 to 30 days
Middle Shade of Green: Invoice age of 30 to 60 days
Light Green: Invoice age of 60 to 90 days
Light Red: Invoice age of 90 to 120 days
Dark Red: Invoice age greater than 120 days Accordingly In the preferred embodiment of the invention each of the analytical units (major nodes) represents a particular client. Each component (minor node) within an analytical unit (major node) represents an outstanding accounts receivable invoice for the client and is associated with that analytical unit. The size of each minor node correlates directly the amount of each invoice and the color correlated to the age of the invoice. The size of each analytical unit (major node) corresponds to the total amount of invoices owed by the client associated with said major node. Accordingly the size and status of each clients accounts receivables and individual invoices is instantaneously perceived by visually intuitive processes of the viewer.

Figure 4:
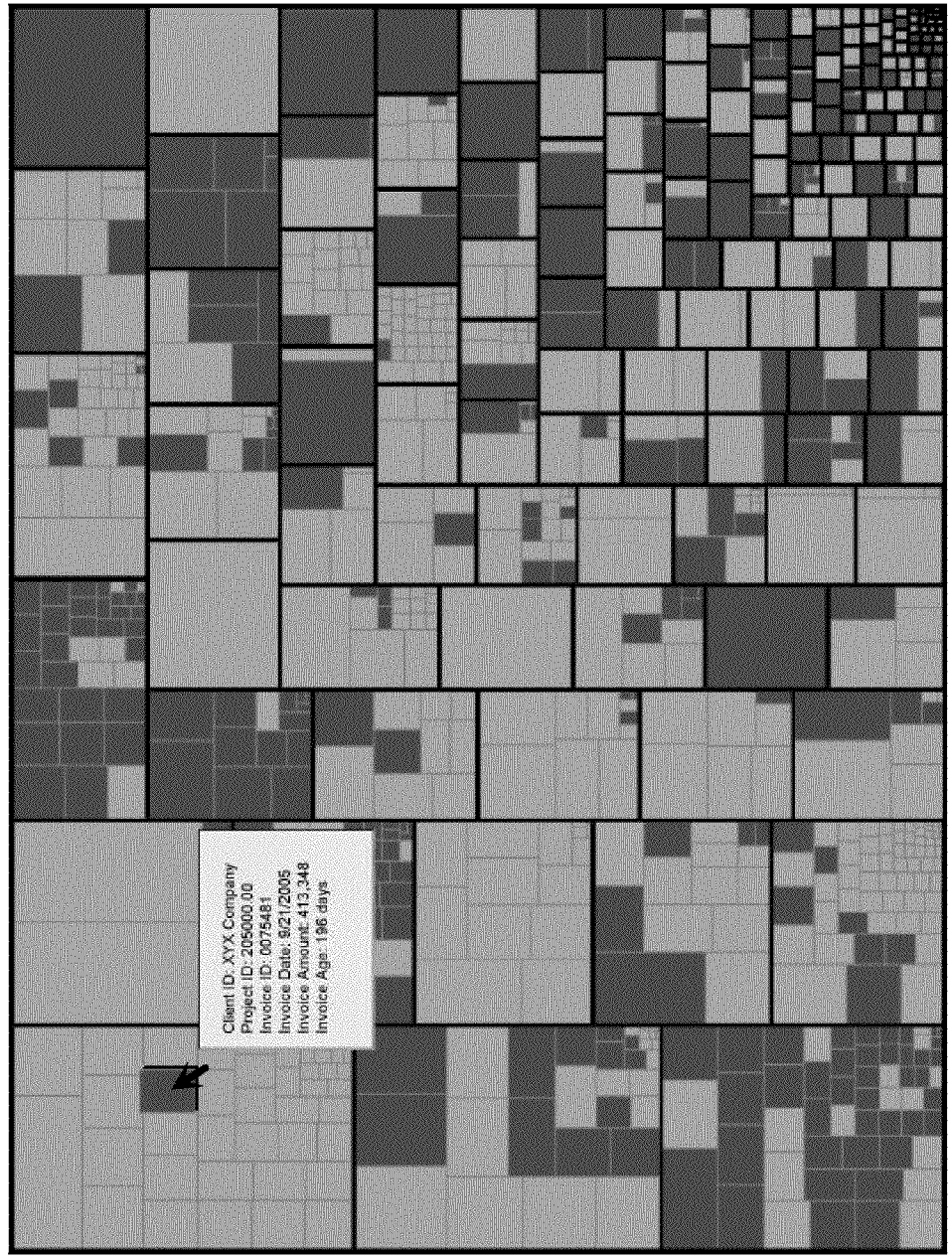
FIG. 4 is the exemplary squarified tree map of FIG. 3 with an exemplary dialog box representing additional data revealed by a computer mouse pointer being over (known as "mouse over" function) a minor (invoice) node of said FIG. 3.

As above, utility of the accounts receivables tree map may be enhanced by associating them with input (mouse and/or keyboard commands). For instance:

Mouse-Over Functions: As is shown in FIG. 4, a "mouse-over" function may assigned to each minor node. When over a minor (invoice) node a pop-up may be used to display the following information:

Client: (client identifying Information)
Project Number: (number assigned to project)
Invoice Number: (number assigned to the invoice represented by minor node) Invoiced
Date: (date invoice represented by minor node was generated)
Invoice Amount: (the total amount of the invoice)
Invoice Age: (the number of days since invoiced)

Left Mouse-Click Functions: In a preferred embodiment of the invention each major or minor node may be associated with left mouse-click function which activates a hyperlink providing additional detail of the data underlying an additional attribute assigned to each minor node, providing the means to "drill-down" into additional details for the major or minor node. For example the mouse left click over any minor (invoice) node contained within a major (client) node may link the user directly to the accounting transaction deals showing all labor postings and invoices generated.

Right Mouse-Click Functions: As described above, in a preferred embodiment of the invention the right mouse click may be used to provide a popup window that contains "zoom in", "zoom out", "zoom to original size", "copy" or "save" functions.

Keyboard Functions: As described above, in a preferred embodiment of the invention the keyboard may be used in conjunction with the mouse to allow the user to zoom in, zoom out and pan the chart to better see smaller nodes.

Figure 5:
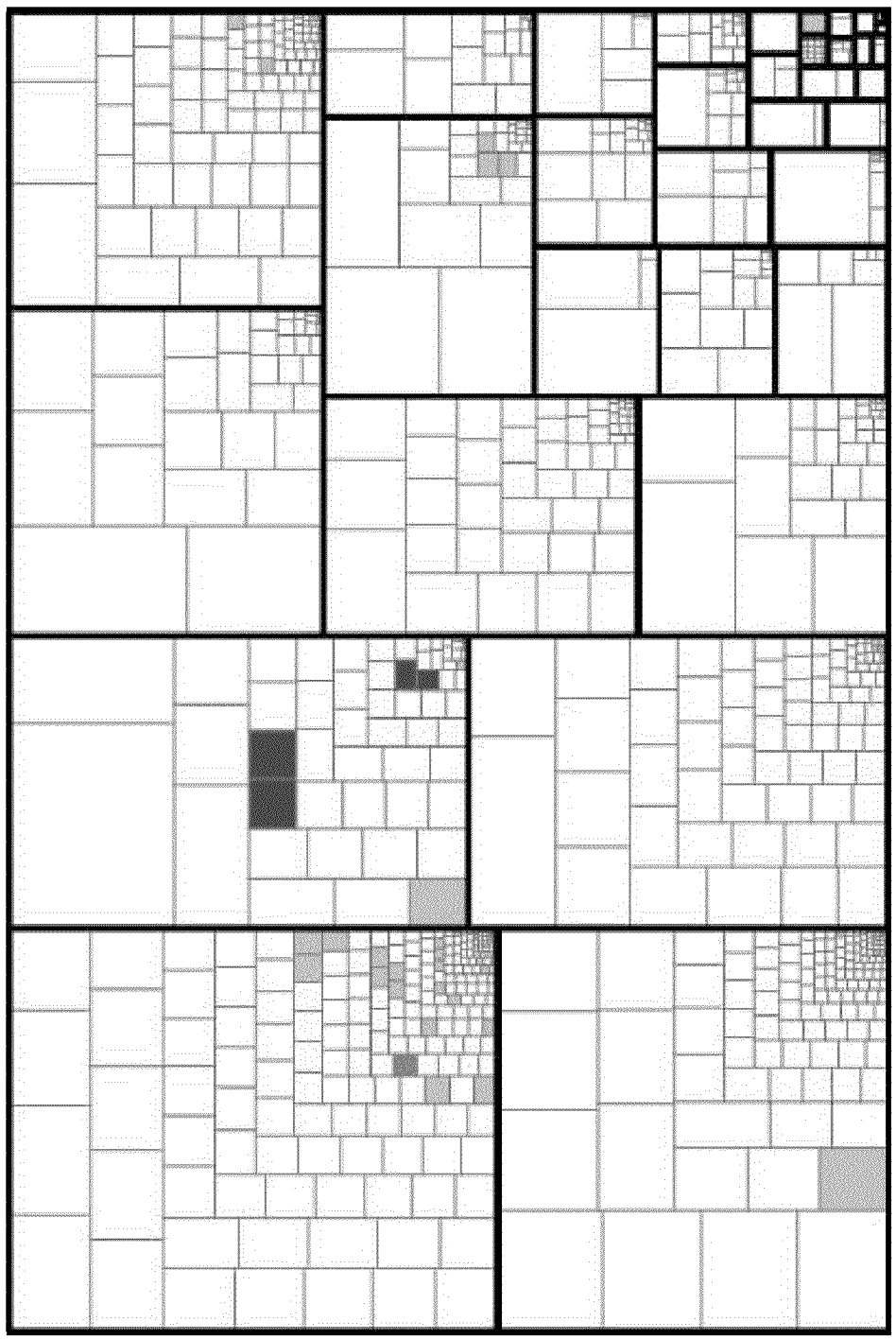
FIG. 5 is an exemplary squarified tree map displaying performance managerial performance of a business enterprise wherein the major nodes of said squarified tree map represent respective managers of said business enterprise and the minor nodes of said squarified tree map represent age of un-billed projects assigned to said respective managers of said business enterprise.

Presentation of Current Managerial Performance, by Respective Managers (Major Node) and Unbilled Projects (Minor Node) Performance:

By way of further example, performance of individual managers of the business may be analyzed by the invention herein disclosed. For example, the entire performance unit (whole tree map of FIG. 5) may have major nodes which represent identities of the individual managers of segments of the business. In such squarified tree map each major node may represent the identity of a particular manager, and each minor node contained therein may be used to represent discrete segments of the business with that manager manages. By way of example each minor node may represent projects assigned to that manager which have billable, but not yet billed labor, material or other costs. The status of each minor node may be represented by color attribute correlating to the age since last labor or materials was attributed to the project. By way of further example, green may be selected as the color attribute representing favorable performance and red selected as the color attribute representing unfavorable performance. So encoded the size of each minor node represents the amount of billable but un-billed labor and/or materials expended on the project, and the color of each minor node would represent length of time since labor and/or materials was last expended on the project (thus need to be recovered by the business). Hence a large, dark red node would indicate a large amount of billable time and/or expenses that have not been billed for a substantial time since the business last incurred costs (which need to be recovered) on the project, thus possibly require corrective action.

Figure 6:
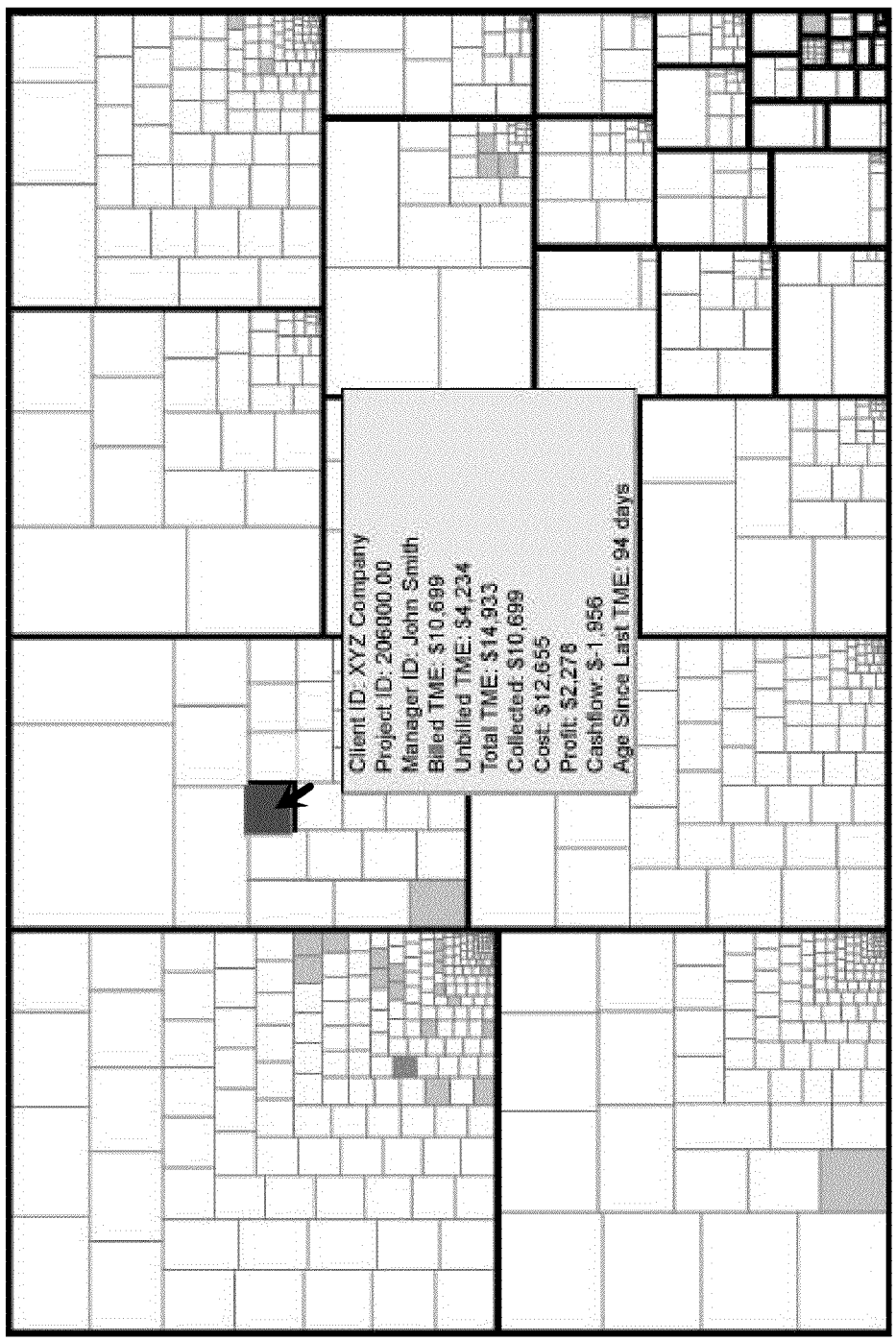
FIG. 6 is the exemplary squarified tree map of FIG. 5 with an exemplary dialog box representing additional data revealed by computer mouse pointer being over (known as "mouse over" function) a minor (project) node of said FIG. 5.

As above, each minor (un-billed costs) node may be associated with pop-up (shown in FIG. 6) which displays:

Client: (client identifying Information)
Project Number: (number assigned to project)
Manager: (manager identifying information)
Billed: (amount invoiced as of current date)
Un-billed: (billable amount not billed as of current date)
Paid: (amount paid by client as of current date)
Costs: (cost of labor, materials and overhead attributable as of current date)
Cashflow: (amount paid less amount of costs as of current date)
Age of Unbilled: (number of days since cost were last posted to the project)

Left Mouse-Click Functions: In a preferred embodiment of the invention each minor node may be associated with left mouse-click function which activates opens a display to the accounting transactions details history underlying the analytical unit component (minor node).

Right Mouse-Click Functions: As described above, in a preferred embodiment of the invention the right mouse click may be used to provide a popup window that contains "zoom in", "zoom out", "zoom to original size", "copy" or "save" functions.

Keyboard Functions: As described above, in a preferred embodiment of the invention the keyboard may be used in conjunction with the mouse to allow the user to zoom in, zoom out and pan the chart to better see smaller nodes.

The invention herein disclosed thus represents a new method visualizing business performance indicators. Using the human visual perceptive system, complex multi-dimensional data is intuitively understood with the most relevant or important information being instantly recognized.

While the above description contains certain specifics, these should not be construed as limitations on the scope of the invention, but rather as an exemplification of one preferred embodiment thereof. Accordingly, the scope of the present invention should be determined not by the embodiment(s) illustrated, but by the appended claims and their legal equivalents.

The invention claimed is:

1. A method, using a computer means, for displaying key performance indicators relating to the current performance of a business enterprise having a plurality of profit centers, each of which profit centers has a plurality of projects, comprising the steps of:
   a. determining key performance indicators which are representative of the current status of said business enterprise;
   b. using a computer means to extract data which is representative of said key performance indicators from an accounting database containing said data;
   c. using a computer means to organize said extracted data into a plurality of discrete analytical units, each of which said discrete analytical units is representative of a project associated with a profit center of said business enterprise;
   d. for each of said discrete analytical units using a computer means to assign a first value which is representative of the magnitude of the potential financial impact of that discrete analytical unit upon the financial well-being of the business enterprise;
   e. for each of said discrete analytical units using a computer means to assign a second value which is representative of a deviation of the performance of that discrete analytical unit from a selected performance for that discrete analytical unit;
   f. for each of said discrete analytical units using a computer means to generate a minor node of a squarified tree map which has an area that is proportional to said first value assigned to said discrete analytical unit;
   g. for each of said profit centers using a computer means to generate a major node of a squarified tree map which has an area comprising the sum of the areas of minor nodes of the discrete analytical units associated with that a profit center;
   h. using a computer means to generate a squarified tree map having an area comprising the sum of areas of said major nodes;
   i. for each of said minor nodes using a computer means to assign a color which correlates to the second value assigned to the discrete analytical unit associated with that minor node;
   j. using a computer means to generate a visual display of said squarified tree map, said major nodes and said minor nodes, wherein the visual display of each of said major nodes is positioned within the visual display of said squarified tree map by descending order of size from a selected corner of said visual display of said squarified tree map to the corner of the visual display of said squarified tree map which is disposed diagonally opposite from said selected corner of said visual display of said squarified tree map and each of said minor nodes is positioned within the visual display of the major node with which it is associated by descending order of size from a selected corner of said visual display of said major node to the corner of the visual display of said major node which is disposed diagonally opposite from said selected corner of said visual display of said major node.

2. The method of claim 1 wherein each of the major nodes of said squarified tree map is associated with a respective profit center of said business enterprise.

3. The method of claim 2 wherein each of said minor nodes is associated with a respective project of a profit center of said business enterprise.

4. The method of claim 3 wherein the size of the visual display of each of said minor nodes represents the magnitude of the potential impact of a key performance indicator upon a project of a profit center of said business enterprise.

5. The method of claim 4 wherein the color assigned each of said minor nodes represents the potential variance of said key performance indicator from selected criteria.

6. The method of claim 4 wherein said key performance indicator represents the potential profit to be derived from a project of a profit center of said business enterprise.

7. The method of claim 6 wherein the size of the visual display of said minor node represents the magnitude of the potential profit to be derived from said project of said profit center of said business enterprise.

8. The method of claim 7 wherein the color of the visual display of said minor node represents the potential variance of the potential profit to be derived from said project of said profit center of said business enterprise.

9. The method of claim 1 wherein each of the major nodes of said squarified tree map is associated with a respective client of said business.

10. The method of claim 9 wherein each of minor nodes is associated with an invoice of the business enterprise to said client.

11. The method of claim 10 wherein the size of the visual display of each of said minor nodes represents the magnitude of each of said invoices.

12. The method of claim 11 wherein the color of the visual display of each of said minor nodes represents the age of each of said invoices.

13. The method of claim 1 wherein each of the major nodes of said squarified tree map is associated with a manager a portion of said business enterprise.

14. The method of claim 9 wherein each of minor nodes is associated with an invoice of the portion of the business enterprise associated with said manager.

15. The method of claim 14 wherein the size of the visual display of each of said minor nodes represents the magnitude of each of said invoices.

16. The method of claim 15 wherein the color of the visual display of each of said minor nodes represents the age of each of said invoices.

* * * * *